(12) United States Patent
Aggarwal et al.

(10) Patent No.: US 7,711,586 B2
(45) Date of Patent: May 4, 2010

(54) METHOD AND SYSTEM FOR UNUSED TICKET MANAGEMENT

(75) Inventors: Gautam Aggarwal, Palo Alto, CA (US); Satnam Alag, Santa Clara, CA (US); Suzette Messa, Ben Lomond, CA (US); Jay GaBany, San Jose, CA (US)

(73) Assignee: Rearden Corporation, Foster City, CA (US)

( * ) Notice: Subject to any disclaimer, the term of this patent is extended or adjusted under 35 U.S.C. 154(b) by 1136 days.

(21) Appl. No.: 11/240,741

(22) Filed: Sep. 30, 2005

(65) Prior Publication Data

US 2006/0190315 A1   Aug. 24, 2006

Related U.S. Application Data

(63) Continuation-in-part of application No. 11/067,537, filed on Feb. 24, 2005.

(51) Int. Cl.
*G06Q 10/00* (2006.01)

(52) U.S. Cl. ............... 705/5; 705/400; 700/14

(58) Field of Classification Search ........... 705/5–10, 705/400; 700/14; 702/172, 178, 187; 706/25, 706/47
See application file for complete search history.

(56) References Cited

U.S. PATENT DOCUMENTS

| 5,237,499 | A | * | 8/1993 | Garback ........................ 705/5 |
|---|---|---|---|---|
| 5,331,546 | A | * | 7/1994 | Webber et al. ................. 705/6 |
| 5,794,207 | A | | 8/1998 | Walker et al. |
| 5,832,453 | A | * | 11/1998 | O'Brien ......................... 705/6 |
| 5,948,040 | A | * | 9/1999 | DeLorme et al. ............ 701/201 |
| 5,991,742 | A | * | 11/1999 | Tran ............................. 705/32 |
| 6,023,679 | A | * | 2/2000 | Acebo et al. .................... 705/5 |
| 6,272,474 | B1 | | 8/2001 | Garcia |
| 6,442,526 | B1 | * | 8/2002 | Vance et al. .................... 705/5 |
| 6,477,520 | B1 | * | 11/2002 | Malaviya et al. .............. 706/47 |
| 6,701,311 | B2 | * | 3/2004 | Biebesheimer et al. ......... 707/5 |
| 6,711,548 | B1 | * | 3/2004 | Rosenblatt ..................... 705/6 |
| 7,050,986 | B1 | * | 5/2006 | Vance et al. .................... 705/5 |
| 7,194,417 | B1 | * | 3/2007 | Jones ............................. 705/5 |
| 7,228,313 | B1 | * | 6/2007 | Hand et al. ............... 707/104.1 |
| 7,302,399 | B1 | * | 11/2007 | Donovan et al. ............... 705/5 |
| 7,363,267 | B1 | * | 4/2008 | Vincent et al. ................ 705/37 |
| 7,401,029 | B2 | * | 7/2008 | Gillespie, Scott .............. 705/6 |

(Continued)

OTHER PUBLICATIONS

Billington, Corey A. et al., U.S. Appl. No. 11/093,353, entitled "Method and System for Anonymous Reslae of Inventory and Profitmaking From Sale of Unused Inventory", filed Mar. 29, 2005.

(Continued)

*Primary Examiner*—Andrew Joseph Rudy
(74) *Attorney, Agent, or Firm*—Greenberg Traurig, LLP

(57) ABSTRACT

A method and system for unused ticket management, that identifying travel data related to one of future or past travel data for one or more travelers; identifying one or more unused travel purchase; generating a value for the unused travel purchase, the value corresponding to the one or more travelers, the respective values based at least in part on the travel data of the one or more travelers; and presenting to at least one of the one or more travelers, one or more options of unused travel purchases and the respective generated values.

19 Claims, 2 Drawing Sheets

U.S. PATENT DOCUMENTS

| | | | |
|---|---|---|---|
| 7,457,950 B1* | 11/2008 | Brickell et al. | 713/156 |
| 7,499,864 B2* | 3/2009 | Campbell et al. | 705/1 |
| 2001/0034663 A1 | 10/2001 | Teveler et al. | |
| 2002/0072937 A1 | 6/2002 | Domenick et al. | |
| 2002/0198629 A1 | 12/2002 | Ellis | |
| 2004/0117281 A1 | 6/2004 | Clydesdale | |
| 2006/0190315 A1 | 8/2006 | Aggarwal | |

OTHER PUBLICATIONS

Billington, Corey A. et al., U.S. Appl. No. 11/096,635, entitled "Method and System for Anonymous Resale of Inventory and Profitmaking From Sale of Unused Inventory," filed Mar. 31, 2005. ProQuest Search.

Wehrle, John, "Slowing Economy is no reason to worry; what goes down must go up; [Fifth Star Lift Edition]", St. Louis Post-Dispatch, St. Louis, Mo., Apr. 17, 2001, p. 3.

Handel, Sean et al., U.S. Appl. No. 11/395,883, entitled "Event and Services Inventory Management System", filed Mar. 31, 2006.

Transaction History of U.S. Appl. No. 11/093,353, filed Mar. 29, 2005, entitled "Method and System for Anonymous Resale of Inventory and Profit-Making From Sale of Unused Inventory."

Transaction History of U.S. Appl. No. 11/096,635, filed Mar. 31, 2005, entitled "Method and System for Anonymous Resale of Inventory and Profit-Making From Sale of Unused Inventory."

Transaction History of U.S. Appl. No. 11/240,741, filed Sep. 30, 2005, entitled "Event and Services Inventory Management System."

Transaction History of U.S. Appl. No. 11/395,883, filed Mar. 31, 2006, entitled "Event and Services Inventory Management System."

"Federation Cooperative," located at http://web.archive.ord/web/20020119153 11/http://www.fedcoop.com, Jan. 19, 2002.

* cited by examiner

METHOD AND SYSTEM FOR UNUSED TICKET MANAGEMENT

The present application is a continuation in part of US application entitled Platform for Multi-Service Procurement, assigned U.S. application Ser. No. 11/067,537 filed on Feb. 24, 2005, and claims priority to U.S. application Ser. No. 11/067,537, which is incorporated herein in its entirety by reference.

BACKGROUND OF THE INVENTION

Business and leisure travel has been on the rise in the last two decades. People are flying more today than they were in the '80s. Consequently, the incidence of travelers changing their itineraries has also increased, and cancellations and modifications of itineraries have become a common practice. The concept of unused tickets (defined as a ticket or voucher for a travel service, which was not used, cannot be fully refunded, and has a residual value of at least $1.00 that can be applied to a future travel service purchase) has arisen as a result of the increase in itinerary changes. With today's travel booking systems, tracking these cancelled or modified tickets is not easy. Recently, a study of a Fortune-100 company reported that said company lost about $6 million in expired unused tickets in 2003 alone. Also, in some cases, a "power traveler" would like to be able to use the "best" possible ticket out of a set of unused tickets.

What is clearly needed is a system that allows travelers to manage their unused tickets and to use them in their future bookings before those tickets expire, and further, to be able to select and use the best possible ticket out of a set of unused tickets.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
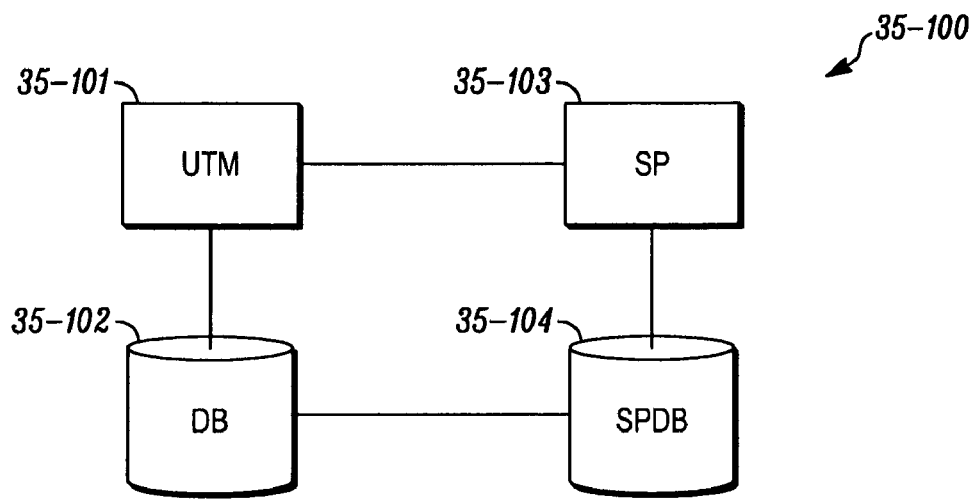
FIG. 1 shows overview of the architecture in accordance with one embodiment.

FIG. 1 shows overview of the architecture of system 35-100 according to the novel art of this disclosure. Unused Ticket Manger (UTM) software instance 35-101 connects to Unused Ticket Bank database (DB) 35-102, which contains data about all unused tickets associated with each traveler and all the relevant information about each ticket (in particular the airline name, residual value and expiration date). The ticket manager 101 connects to a service platform (SP) 35-103, such as the Rearden Services Platform, that typically includes a trip booking system. Service platform 35-103 has the ability to capture a user's travel and usage behavior. Data such as how many trips a user makes in year, how often these trips are made, to which cities these trips are made, the average ticket cost in each market, on what airlines the user tends to fly, the chances of the trips being cancelled or modified, etc., are typically stored in a database (SPDB) 35-104, which typically would be part of service platform 35-103. Said SPDB 35-204 would contain all kinds of data relating to service platform 35-103, many of which is not related to the present invention. In some cases, UTM DB 35-102 may be part of SPDB 35-104, and in some cases, SPDB 35-104 my be not a single database, but a large number of separate databases, and in some cases they may be spread out in many locations and or companies In some cases, if this behavioral data is available, the ticket manager 35-101 can apply the algorithms to predict the user's next trip date, location, airlines, etc. By applying probability and other mathematical tools, such as decision trees, rules and constraints, Fourier transformations etc.

In other cases, when a user plans a new trip, the system may offer information about how best to recycle a ticket, simply based on direct interaction with the user, for example by asking a couple of simple questions, to make up for data not available for projections. Initially, system 35-100 does not contain enough transactional information for the UTM 35-101 to make an accurate prediction of the expected value of an unused ticket. The system, however, has access in database 35-104 to user attributes such as the user's role in a company (department), the job level, geographic location, etc.

Figure 2:
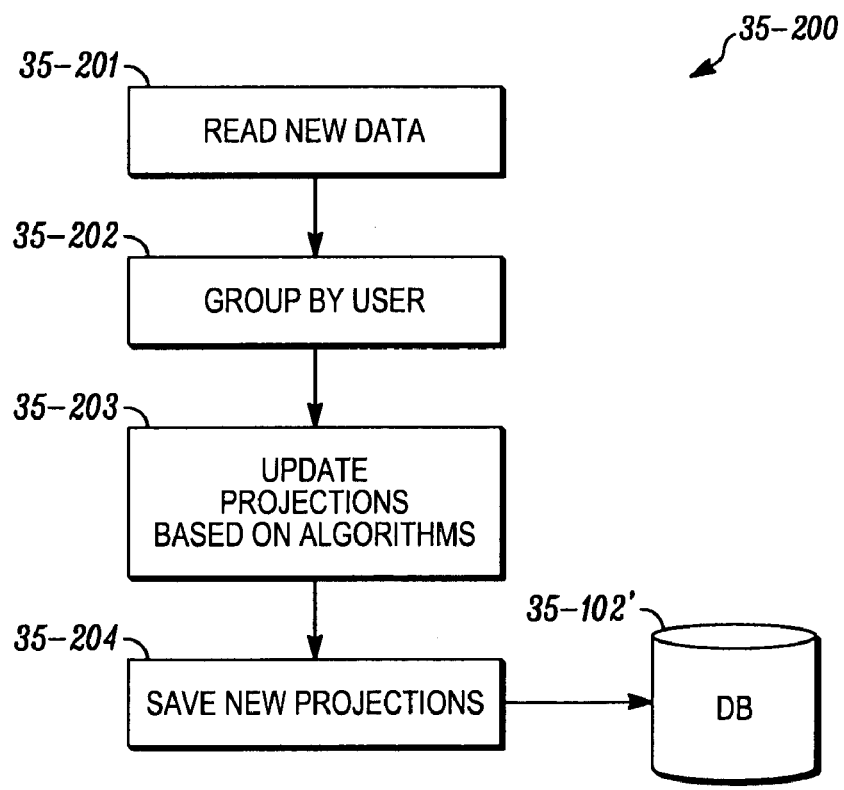
FIG. 2 shows an example of a statistical analysis program in accordance with one embodiment.

FIG. 2 shows an example of a statistical analysis program 35-200, which could run from time to time, or could be triggered by certain events such as travel bookings and or cancellations. In step 35-201 the program reads new data, which data is then sorted in step 35-202 into appropriate groups of users, based on user attributes, to build a prediction model for expected travel. Associated with each prediction is a probability (a metric between 0 and 1) that quantifies the expected accuracy of the prediction. Over a period of time this generic model for a user is updated with his specific travel history to make a more specific prediction of the user's expected value for an unused ticket. This user information may be preprocessed in some cases, as shown in step 32-203, and compiled into user- or group-specific projections (or both), which then are saved in step 35-203 into DB 35-102', a subset of DB 35-102.

Figure 3:
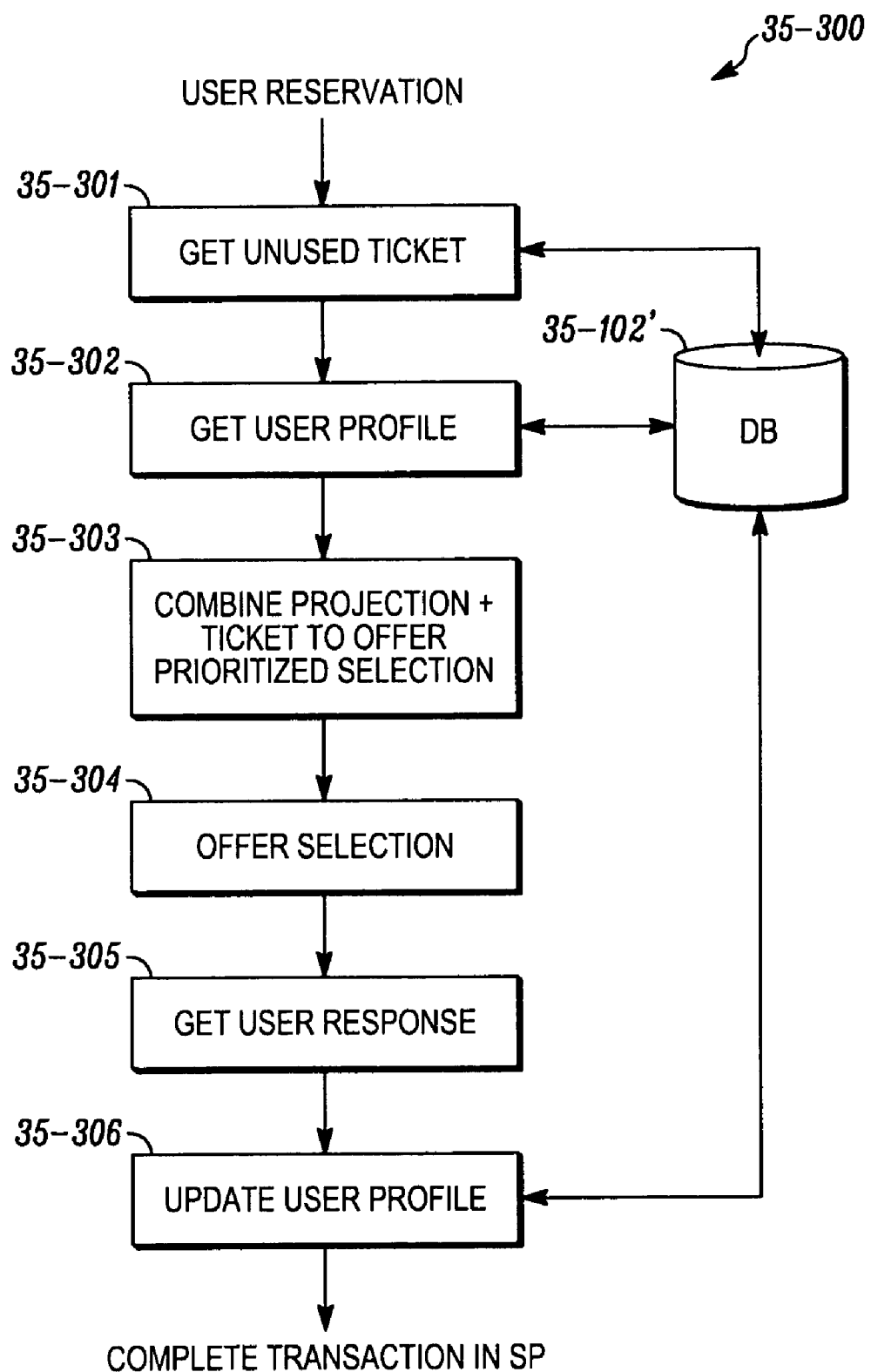
FIG. 3 shows a flow diagram describing a process in accordance with one embodiment.

FIG. 3 shows an example of a process 35-300 that may be applied at the time a booking is made. In step 35-301 all relevant data about each unused ticket, such as net residual value, traveler(s), and expiration date, are picked up from DB 35-102'. Then in step 35-302, the user's (that is, the traveler's) profile, including personal and/or group projections, etc. is retrieved from a database such as SPDB 35-104, although in some cases such data may be stored in DB 35-102'. In step 35-303, each ticket is then ranked based on these criteria and evaluated for the residual amount's current net value, basing the evaluation on how soon the ticket expires and a rules and or knowledge base, such as, for example, SP 35-103, containing company and airline rules, preferences, etc. Prioritized by their rankings, one or more possible unused tickets are offered in step 35-304, singly or in combination.

For example, there could be two unused tickets on American Airlines with residual value $75 (expiring in two weeks) and $120 (expiring in three months). Now, if a traveler decides to travel to some place on American in two days and both tickets can apply, the question is, which ticket to choose? If this traveler travels once in nine months, chances of him traveling after this trip in the next three months are almost zero. Thus the option with the most residual value, i.e., $120, should be picked, resulting in a loss of $75. If the $75 option is selected, the traveler would have had to pay out of pocket $45 extra for the new purchase, and the chances of him losing another $120 would have been very high. Potentially, he would have lost $165 dollars versus $75. So he would have had to pay $45 now for an uncertain future savings of $120. However, if the traveler travels, on average, every week, and the system knows that the chances of him taking a trip in the next three months to a destination for which the system could use the $120 ticket is very high, it would apply the $75 ticket and keep the $120 one for future usage.

In yet other cases, a special offer for a new ticket may get preference for the new booking, without applying an unused ticket, because buying the new ticket may end up as less expensive than paying the additional fare for re-issuing the unused ticket.

In step 35-306, the user then can make an educated selection, as offered under the company rules and policies, or in some cases he may choose to, or have to, override such rules. His selection is then also saved into DB 102' to update his and or his group's profile.

The example above clearly articulates a novel system that can determine what to pick, either the most valuable ticket or the soonest-to expire ticket, without looking at the user's travel practices. Thus the system according to the novel art of this disclosure can help travelers and their companies better manage and track their unused tickets and use them well, while also helping corporations to avoid losing large amounts, as they currently do.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

It is clear that many modifications and variations of this embodiment may be made by one skilled in the art without departing from the spirit of the novel art of this disclosure.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

What is claimed is:

1. A computer-implemented method comprising:
   identifying, by a computer server, travel data related to at least one of future and past travel data pre-associated with at least one traveler;
   identifying at least one unused travel purchase;
   generating a value for the unused travel purchase, the value corresponding to the at least one traveler, the respective values based at least on one of the travel data of the at least one traveler, a residual value of the unused travel purchase, and an expiration date of the unused travel purchase; and
   presenting to at least one traveler, an option to purchase at least one unused travel purchase at the respective generated value.

2. The method of claim 1, wherein the generating includes predicting future travel for at least one traveler based at least in part on past travel data related to the at least one traveler.

3. The method of claim 2, farther comprising, in response to at least one traveler initiating a travel request.

4. The method of claim 1, performed in response to one or more of a request for a travel booking by at least one traveler, a cancellation of a planned travel, and a passage of a predetermined length of time.

5. The method of claim 1, in response to at least one traveler requesting a travel booking, performing the identifying data.

6. The method of claim 1, wherein the travel data includes one or more of a quantity of prior travels by the traveler, a frequency of travels within a predetermined length of time, prior destinations of the travels, cost of the travels, carriers used in the prior travels, and a quantity or frequency of cancellations or modifications of prior travels.

7. The method of claim 1, performed prior to a request for travel plans by at least one traveler.

8. The method of claim 1, further comprising storing the travel data into separate groups of travelers based on attribute data corresponding to respective travelers.

9. The method of clam 8, wherein the attribute data includes one or more of a traveler's position in an organization and geographical location.

10. A machine readable medium having stored thereon a set of instructions which when executed by a computer server, perform a method comprising of:
    identifying travel data related to at least one of future and past travel data for pre-associated with at least one traveler;
    identifying at least one or more unused travel purchase;
    generating a value for the unused travel purchase, the value corresponding to the at least one traveler, the respective values based at least on one of the travel data of the at least one traveler, a residual value of the unused travel purchase, and an expiration date of the unused travel purchase; and
    presenting to at least one of the one or more travelers traveler, an option to purchase at least one unused travel purchase at the respective generated value.

11. The machine-readable medium of claim 10, wherein the generating the value for the unused travel purchase is based at least in part on a residual value of the unused travel purchase and an expiration date of the unused travel purchase.

12. The machine-readable medium of claim 10, wherein the generating includes predicting future travel for at least one traveler based at least in part on past travel data related to the at least one traveler.

13. The machine-readable medium of claim 12, further comprising, in response to at least one of traveler initiating a travel request.

14. The machine-readable medium of claim 10, performed in response to at least one of a request for a travel booking by at least one traveler, a cancellation of a planned travel, and a passage of a predetermined length of time.

15. The machine-readable medium of claim 10, in response to at least one traveler requesting a travel booking, performing the identifying data.

16. The machine-readable medium of claim 10, wherein the travel data includes one or more of a quantity of prior travels by the traveler, a frequency of travels within a predetermined length of time, prior destinations of the travels, cost of the travels, carriers used in the prior travels, and a quantity or frequency of cancellations or modifications of prior travels.

17. The machine-readable medium of claim 10, performed prior to a request for travel plans by at least one traveler.

18. The machine-readable medium of claim 10, further comprising storing the travel data into separate groups of travelers based on attribute data corresponding to respective travelers.

19. A system comprising:
   means for identifying travel data related to at least one of future and past travel data pre-associated with at least one traveler;
   means for identifying at least one unused travel purchase;
   means for generating a value for the unused travel purchase, the value corresponding to the at least one traveler, the respective values based at least on one of the travel data of the at least one traveler, a residual value of the unused travel purchase, and an expiration date of the unused travel purchase; and
   means for presenting to at least one traveler, an option to purchase at least one unused travel purchase at the respective generated value.

\* \* \* \* \*